United States Patent
Wang et al.

(10) Patent No.: US 12,066,809 B2
(45) Date of Patent: Aug. 20, 2024

(54) METHOD FOR IDENTIFYING CRITICAL ERROR OF WORM GEAR MACHINE AND METHOD FOR ITERATIVELY COMPENSATING CRITICAL ERROR OF WORM GEAR MACHINE

(71) Applicant: Chongqing University, Chongqing (CN)

(72) Inventors: Shilong Wang, Chongqing (CN); Chi Ma, Chongqing (CN); Sibao Wang, Chongqing (CN); Dechao Heng, Chongqing (CN); Lingwan Zeng, Chongqing (CN); Yong Yang, Chongqing (CN); Canhui Yang, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 416 days.

(21) Appl. No.: 17/470,015

(22) Filed: Sep. 9, 2021

(65) Prior Publication Data
US 2022/0334550 A1 Oct. 20, 2022

(30) Foreign Application Priority Data
Apr. 12, 2021 (CN) .......................... 202110390853.0

(51) Int. Cl.
*G05B 19/40* (2006.01)
*F16H 57/01* (2012.01)
(Continued)

(52) U.S. Cl.
CPC ........... *G05B 19/404* (2013.01); *F16H 57/01* (2013.01); *G05B 19/406* (2013.01); *G06F 30/10* (2020.01);
(Continued)

(58) Field of Classification Search
CPC ..... G05B 19/404; G05B 19/406; G06F 30/10; G06F 30/27; G06F 2119/02; G06N 5/01; F16H 57/01; F16H 2057/012
See application file for complete search history.

(56) References Cited

U.S. PATENT DOCUMENTS

2015/0300479 A1* 10/2015 Frank ...................... F16H 57/01
324/207.2
2020/0133227 A1* 4/2020 Mikado .............. G05B 19/4062

FOREIGN PATENT DOCUMENTS

| CN | 104907635 | A | * | 9/2015 |
| CN | 107966957 | B | * | 10/2019 |
| CN | 110298485 | A | * | 10/2019 |

OTHER PUBLICATIONS

Chen et al., A comprehensive error analysis method for the geometric error of multi-axis machine tool, 2016.*
(Continued)

*Primary Examiner* — Mohamed Charioui
*Assistant Examiner* — Lynda Dinh
(74) *Attorney, Agent, or Firm* — Nath, Goldberg & Meyer; Joshua B. Goldberg

(57) ABSTRACT

A method for identifying a critical error of a worm gear machine, step 1: obtaining an actual forward kinematic model $T_{27}^a$ and an ideal forward kinematic model $T_{27}^i$ from a coordinate system of a worm gear hob to a coordinate system of a worm gear, thereby establishing a geometric error-pose error model of the worm gear machine; step 2: regarding the geometric error-pose error model of the worm gear machine as a multi-input multi-output (MIMO) nonlinear system, and solving, by taking the geometric error of each motion axis of the worm gear machine as an input feature X, and a pose error between the worm gear hob and the worm gear as an output variable Y, an importance coefficient of each input feature with a random forest algo-
(Continued)

rithm; and step 3: determining a critical error affecting a machining accuracy of the worm gear machine.

12 Claims, 3 Drawing Sheets

(51) Int. Cl.
*G05B 19/404* (2006.01)
*G05B 19/406* (2006.01)
*G06F 30/10* (2020.01)
*G06F 30/27* (2020.01)
*G06N 5/01* (2023.01)
*G06F 119/02* (2020.01)

(52) U.S. Cl.
CPC ............... *G06F 30/27* (2020.01); *G06N 5/01* (2023.01); *F16H 2057/012* (2013.01); *G06F 2119/02* (2020.01)

(56) References Cited

OTHER PUBLICATIONS

Xia et al, Transmission chain error elimination for gear hobbing machines based on classified compensation theory and frequency response identification, 2020.*

Vilmos Simon, The Influence of Gear Hobbing on Worm Gear Characteristics, 2007.*

Jaster. Lean Hobbing Gears on a multi-Axis Machine.*

* cited by examiner

METHOD FOR IDENTIFYING CRITICAL ERROR OF WORM GEAR MACHINE AND METHOD FOR ITERATIVELY COMPENSATING CRITICAL ERROR OF WORM GEAR MACHINE

CROSS REFERENCE TO RELATED APPLICATION(S)

This patent application claims the benefit and priority of Chinese Patent Application No. 202110390853.0, filed on Apr. 12, 2021, the disclosure of which is incorporated by reference herein in its entirety as part of the present application.

TECHNICAL FIELD

The present disclosure belongs to the technical field of mechanical error analysis, and in particular, to a method for identifying a critical error of a worm gear machine and a method for iteratively compensating a critical error of a worm gear machine.

BACKGROUND ART

The machining accuracy of a high-accuracy worm gear machine is restricted by various error factors, mainly including static and dynamic error factors. Geometric errors of a machine tool, as the leading roles in the static error factors, typically arise from original manufacture, placement or wear of parts on the worm gear machine, and can be divided into geometric errors in placement of the parts, geometric errors in the movement of the motion axes, etc. In view of repeatability of the geometric errors of the machine tool, experts, scholars or machine tool manufacturers often reduce or even eliminate the influence on a final machining error of the machine tool by measuring and identifying the errors first and then compensating them.

As a typical device in the worm gear machining, the high-accuracy worm gear machine is similar to a gear hobbing machine, and uses a generating-enveloping-hobbing type formation mechanism. Each item of geometric error will form a relative pose error between the worm gear hob and the worm gear, thereby affecting the machining accuracy of the worm gear. At present, most scholars are often committed to compensate and eliminate some item of geometric error or several items of geometric errors but less to model and compensate a comprehensive error of the worm gear machine under the coupling action of multiple geometric error elements, so there is a lack of systematic modeling and compensating methods. That is, existing analysis on coupling and modeling for multiple geometric errors of the worm gear machine is far from systematic, and there is no comprehensive and quantitative analysis made to individual and coupling effects of all geometric error elements on the machining error of the worm gear as well as no technical bases for supporting identification of a critical error item. In addition, there are also no methods for compensating geometric errors or critical error items of the worm gear machine.

SUMMARY

In view of this, an objective of the present disclosure is to provide a method for identifying a critical error of a worm gear machine and a method for iteratively compensating a critical error of a worm gear machine. The present disclosure establishes a pose error relation between a worm gear hob and a worm gear of the worm gear machine under the coupling influence of multiple geometric error elements, and identifies a critical error element of a pose error with a random forest algorithm, and then performs specific error iterative compensation upon the identification of the critical error, thereby improving the machining accuracy of the worm gear machine.

To achieve the above-mentioned objective, the present disclosure provides the following technical solutions:

The present disclosure first provides a method for identifying a critical error of a worm gear machine, including the following steps:

step a): analyzing a geometric error of each motion axis of a worm gear machine, and obtaining an actual forward kinematic model $T_{27}{}^a$ and an ideal forward kinematic model $T_{27}{}^u$ from a coordinate system of a worm gear hob to a coordinate system of a worm gear based on a motion chain of the worm gear machine, thereby establishing a geometric error-pose error model of the worm gear machine;

step b): regarding the geometric error-pose error model of the worm gear machine as a multi-input multi-output (MIMO) nonlinear system, and solving, by taking the geometric error of each motion axis of the worm gear machine as an input feature X, and a pose error between the worm gear hob and the worm gear blank as an output variable Y, an importance coefficient of each input feature with a random forest algorithm; and step c): according to the solved importance coefficient of each input feature, determining a critical error affecting a machining accuracy of the worm gear machine.

Further, in the step a), a method for establishing the geometric error-pose error model of the worm gear machine may be as follows:

step a1) analyzing a geometric error of the worm gear machine;

step a2) obtaining the actual forward kinematic model $T_{27}{}^a$ and the ideal forward kinematic model $T_{27}{}^i$ from the coordinate system of the worm gear hob to the coordinate system of the worm gear according to the motion chain of the worm gear machine; and step a3) establishing the geometric error-pose error model of the worm gear machine from the actual forward kinematic model $T_{27}{}^a$ and the ideal forward kinematic model $T_{27}{}^i$.

Further, in the step a1), geometric errors of X-, Y-, Z-, and C-motion axes of the worm gear machine may be considered, where:

each motion axis may include 6 items of position-dependent geometric errors (PDGEs), including: an x-direction linear error $\delta_x(s)$ of an S-axis in motion, a y-direction linear error $\delta_y(s)$ of the S-axis in motion, a z-direction linear error $\delta_z(s)$ of the S axis in motion, a x-direction angular error $\varepsilon_x(s)$ of the S-axis in motion, a y-direction angular error $\varepsilon_y(s)$ of the S-axis in motion, and a z-direction angular error $\varepsilon_z(s)$ of the S-axis in motion, where s represents a motion instruction of the motion axis S, and s=x, y, z, c;

position-independent geometric errors (PIGEs) may be present between the motion axes, including: a perpendicularity error $\varphi_{yz}$ between the X-axis and the Z-axis, a perpendicularity error $\varphi_{zy}$ between the Y-axis and the Z-axis, and a perpendicularity error $\varphi_{xy}$ between the Y-axis and the X-axis; and the C axis may have four items of placement errors, including: a x-direction linear error $\delta_{xc}$ of the C-axis in placement, a y-direction linear error $\delta_{yc}$ of the C-axis in placement, an x-direction angular error $\varphi_{xc}$ of the C-axis in placement, and a y-direction angular error $\varphi_{yc}$ of the C-axis in placement.

Further, in the step a2), with the worm gear hob as a transfer end point, the worm gear machine have may the following motion chain: worm gear→C-axis→bed→X-axis→Z-axis→Y-axis→B-axis→worm gear hob, where the worm gear-C-axis-bed serves as a workpiece chain, and the bed→X-axis→Z-axis→Y-axis→B-axis→worm gear hob serves as a cutter chain;

during consideration of the geometric errors, an actual kinematic model of the tool chain is:

$$T_{02}^a = T_{01}T_{12} = T_{p01}T_{pe01}T_{m01}T_{me01} \times T_{p12}T_{pe12}T_{m12}T_{me12};$$

and an ideal kinematic model of the tool chain is:

$$T_{02}^i = T_{01}^i T_{12}^i = T_{p01} T_{m01} \times T_{p12} T_{m12}$$

where, $T_{02}^a$ and $T_{02}^i$ represent an actual transformation matrix and an ideal transformation matrix from the worm gear to the bed, respectively; $T_{01}$ and $T_{01}^i$ represent an actual transformation matrix and an ideal transformation matrix from the C-axis to the bed, respectively; $T_{12}$ and $T_{12}^i$ respectively represent an actual transformation matrix and an ideal transformation matrix from the worm gear to the C-axis; $T_{p01}$ represents a placement matrix from the C-axis to the bed; $T_{pe01}$ represents a placement error matrix from the C-axis to the bed; $T_{m01}$ represents a motion matrix from the C-axis to the bed; $T_{me01}$ represents a motion error matrix from the C-axis to the bed; $T_{p12}$ represents a placement matrix from the worm gear to the C-axis; $T_{pe12}$ represents a placement error matrix from the worm gear to the C-axis; $T_{m12}$ represents a motion matrix from the worm gear to the C-axis; and $T_{me12}$ represents a motion error matrix from the worm gear to the C-axis; and during consideration of the geometric errors, an actual kinematic model of the cutter chain is:

$$T_{07}^a = T_{03}T_{34}T_{45}T_{56}T_{67} = T_{p03}T_{pe03}T_{m03}T_{me03} \times T_{p34}T_{pe34}T_{m34}T_{me34} \times T_{p45}T_{pe45}T_{m45}T_{me45} \times T_{p56}T_{pe56}T_{m56}T_{me56} \times T_{p67}T_{pe67}T_{m67}T_{me67}$$

and an ideal kinematic model of the cutter chain is:

$$T_{07}^i = T_{p03}T_{m03}T_{p34}T_{m34}T_{p45}T_{m45}T_{p56}T_{m56}T_{p67}T_{m67}$$

where, $T_{07}^a$ and $T_{07}^i$ respectively represent an actual transformation matrix and an ideal transformation matrix from the worm gear hob to the bed; $T_{03}$ represents an actual transformation matrix from the X-axis to the bed; $T_{34}$ represents an actual transformation matrix from the Z-axis to the X-axis; $T_{45}$ represents an actual transformation matrix from the Y-axis to the Z-axis; $T_{56}$ represents an actual transformation matrix from the B-axis to the Y-axis; $T_{67}$ represents an actual transformation matrix from the worm gear hob to the B-axis; $T_{p03}$ represents a placement matrix from the X-axis to the bed; $T_{pe03}$ represents a placement error matrix from the X-axis to the bed; $T_{m03}$ represents a motion matrix from the X-axis to the bed; $T_{me03}$ represents a motion error matrix from the X-axis to the bed; $T_{p34}$ represents a placement matrix from the Z-axis to the X-axis; $T_{pe34}$ represents a placement error matrix from the Z-axis to the X axis; $T_{m34}$ represents a motion matrix from the Z-axis to the X-axis; $T_{me34}$ represents a motion error matrix from the Z-axis to the X-axis; $T_{p45}$ represents a placement matrix from the Y-axis to the Z-axis; $T_{pe45}$ represents a placement error matrix from the Y-axis to the Z-axis; $T_{m45}$ represents a motion matrix from the Y-axis to the Z-axis; $T_{me45}$ represents a motion error matrix from the Y-axis to the Z-axis; $T_{p56}$ represents a placement matrix from the B-axis to the Y-axis; $T_{pe56}$ represents a placement error matrix from the B-axis to the Y-axis; $T_{m56}$ represents a motion matrix from the B-axis to the Y-axis; $T_{me56}$ represents a motion error matrix from the B-axis to the Y-axis; $T_{p67}$ represents a placement matrix from the worm gear hob to the B-axis; $T_{pe67}$ represents a placement error matrix from the worm gear hob to the B-axis; $T_{m67}$ represents a motion matrix from the worm gear hob to the B-axis; and $T_{me67}$ represents a motion error matrix from the worm gear hob to the B-axis, thereby obtaining the actual forward kinematic model of the worm gear machine from the coordinate system of the worm gear hob to the coordinate system of the worm gear:

$$T_{27}^a = (T_{02}^a)^{-1} T_{07}^a;$$

and obtaining the ideal forward kinematic model of the worm gear machine from the coordinate system of the worm gear hob to the coordinate system of the worm gear:

$$T_{27}^i = (T_{02}^i)^{-1} T_{07}^i.$$

Further, in the step a3), assuming that a cutter tip position vector and a cutter axis vector in the coordinate system of the worm gear hob are respectively $P_t$ and $Q_t$, actual cutter position data under the influence of the geometric errors is:

$$\begin{bmatrix} Q'_w & P'_w \\ 0 & 1 \end{bmatrix} = T_{27}^a \begin{bmatrix} Q_t & P_t \\ 0 & 1 \end{bmatrix}$$

where, $P'_w = [x', y', z']^T$ and $Q'_w = [i', j', k']^T$ represent an actual cutter tip position vector and an actual cutter axis vector, respectively; and the geometric error-pose error model of the worm gear machine is obtained by performing subtraction on the actual cutter position data and ideal states of the worm gear hob and the worm gear:

$$\begin{bmatrix} \Delta i & \Delta x \\ \Delta j & \Delta y \\ \Delta k & \Delta z \\ 0 & 1 \end{bmatrix} = (T_{27}^a - T_{27}^i) \begin{bmatrix} Q_t & P_t \\ 0 & 1 \end{bmatrix}$$

where, $\Delta i$ represents an x-coordinate error of cutter axis vector data; $\Delta j$ represents a y-coordinate error of the cutter axis vector data; $\Delta k$ represents a z-coordinate error of the cutter axis vector data; $\Delta x$ represents an x-coordinate error of cutter tip position data; $\Delta y$ represents a y-coordinate error of the cutter tip position data; and $\Delta z$ represents a z-coordinate error of the cutter tip position data.

Further, in the step b), a method for solving the importance coefficient of each input feature with the random forest algorithm may be as follows:

step b1) establishing a decision tree $T_b$ with a bootstrap sampling set, and taking a sample not participating in establishment of the decision tree as an out-of-bag (OBB) sample $x_b^{obb}$;

step b2) predicting the $x_b^{obb}$ with the established decision tree $T_b$, and computing a correctly classified resolution $R_b^{obb}$;

step b3) for a geometric error element $x_j$ (j=1, ..., 31), changing the value of the $x_j$ in the $x_b^{obb}$ during initialization, and recording the value as $x_{bj}^{obb}$; and then, predicting the $x_{bj}^{obb}$ with the decision tree $T_b$, and recording a correctly classified resolution as $R_{bj}^{obb}$; and step b4) repeating the step b1) to the step b3), such that an importance coefficient $D_j$ of the geometric error element $x_j$ is:

$$D_j = \frac{1}{n}\sum_{b=1}^{n}\left(R_b^{obb} - R_{bj}^{obb}\right)$$

where, n is the number of repeated times.

The present disclosure further provides a method for iteratively compensating a critical error of a worm gear machine, including the following steps:

step e): by using the above-mentioned method for identifying a critical error of a worm gear machine, determining a critical error affecting a machining accuracy of a worm gear machine, retaining the identified critical error item, and simplifying a geometric error-pose error model of the worm gear machine;

step f): assuming that an actual x-direction position of a worm gear hob is $x+\Delta x(x,y,z,c)$, obtaining a following iteration form of x:

$$x_{i+1}=x^i-f_{\Delta x}(x_i, y_i, z_i, c_i)$$

where, $x_{i+1}$ represents an iterative value of a numerical control (NC) instruction x; $x^i$ represents an instruction when an X-axis reaches a predetermined position; $f_{66\ x}(\bullet)$ represents a mapping function between the critical error item and an x-direction pose error; and a subscript i represents the number of iterative times;

assuming that an actual x-direction position of the worm gear hob is $z+\Delta z(x,y,z,c)$, obtaining a following iteration form of z:

$$z_{i+1}=z^i-f_{\Delta z}(x_{i+1}, y_i, z_i, c_i)$$

where, $z_{i+1}$ represents an iterative value of an NC instruction z; $z^i$ represents an instruction when a Z-axis reaches a predetermined position; and $f_{\Delta z}(\bullet)$ represents a mapping function between the critical error item and a z-direction pose error;

assuming that an actual y-direction position of the worm gear hob is $y+\Delta y(x,y,z,c)$, obtaining a following iteration form of y:

$$y_{i+1}=y^i-f_{\Delta y}(x_{i+1}, y_i, z_i, c_i)$$

where, $y_{i+1}$ represents an iterative value of an NC instruction y; $y^i$ represents an instruction when a Y-axis reaches a predetermined position; and $f_{\Delta y}(\bullet)$ represents a mapping function between the critical error item and a y-direction pose error; and assuming that an actual c-direction position of the worm gear hob is $c+\Delta c(x,y,z,c)$, obtaining a following iteration form of c:

$$c_{i+1}=c^i-f_{\Delta c}(x_i, y_i, z_i, c_i)$$

where, $c_{i+1}$ represents an iterative value of an NC instruction c; $c^i$ represents an instruction when a C-axis reaches a predetermined position; and $f_{\Delta c}(\bullet)$ represents a mapping function between the critical error item and a c-direction pose error;

step g): iteratively compensating the critical error, and determining whether a motion accuracy of each of the X-, Z-, Y- and C-axes meets a preset threshold requirement; if yes, executing step d); and if no, letting $x_i=x_{i+1}$, $z_i=z_{i+1}$, $y_i=y_{i+1}$, $c_i=c_{i+1}$ and i=i+1 and executing step f); and step d): outputting an actual NC instruction $(x_i, y_i, z_i, c_i)$.

Further, in the step g), the motion accuracy of each of the X-, Z-, Y-, and C-axes may meet:

$$\begin{cases} |x_{i+1} - x_i| \leq \Delta_x \\ |z_{i+1} - z_i| \leq \Delta_z \\ |y_{i+1} - y_i| \leq \Delta_y \\ |c_{i+1} - c_i| \leq \Delta_c \end{cases}$$

where, $\Delta_x$, $\Delta_z$, $\Delta_y$ and $\Delta_c$ represent a maximum allowable threshold for the motion accuracies of the X-, Z-, Y- and C-axes, respectively.

The present disclosure has the following beneficial effects:

The method for identifying the critical error of the worm gear machine and method for iteratively compensating the critical error of the worm gear machine provided by the present disclosure establish a pose error relation between a worm gear hob and a worm gear of the worm gear machine under the coupling influence of multiple geometric error elements to quantitatively analyze degrees of influence of the multiple geometric error elements on a machining accuracy of a worm gear; and by taking a geometric error of each motion axis of the worm gear machine as an input feature X and a pose error between the worm gear hob and the worm gear as an output variable Y, and an importance coefficient of each input feature is solved with a random forest algorithm to identify the critical error element affecting the machining accuracy of the worm gear machine.

The method for iteratively compensating the critical error of the worm gear machine provided by the present disclosure simplifies the geometric error-pose error model of the worm gear machine by using the identified critical error affecting the machining accuracy of the worm gear machine, and then performs error iterative compensation on NC codes x, z, y and c till a motion accuracy of X-, Z-, Y-, and C-axes meets a set threshold requirement, thereby improving the machining accuracy of the worm gear machine.

BRIEF DESCRIPTION OF THE DRAWINGS

In order to make the objectives, technical solutions and beneficial effects of the present disclosure clearer, the present disclosure provides the following descriptions on the accompanying drawings.

DETAILED DESCRIPTION OF THE EMBODIMENTS

The present disclosure will be further described in combination with accompanying drawings and specific examples so as to enable those skilled in the art to better understand and practice the disclosure, but the illustrated examples do not constitute any limitation to the present disclosure.

A method for identifying a critical error of a worm gear machine in the embodiment includes the following steps:

Step a): Analyze a geometric error of each motion axis of a worm gear machine, and obtain an actual forward kinematic model $T_{27}^a$ and an ideal forward kinematic model $T_{27}^i$ from a coordinate system of a worm gear hob to a coordinate system of a worm gear based on a motion chain of the worm gear machine, thereby establishing a geometric error-pose error model of the worm gear machine.

Specifically, a method for establishing the geometric error-pose error model of the worm gear machine is as follows:

11) Analyze a geometric error of the worm gear machine.

Figure 1:
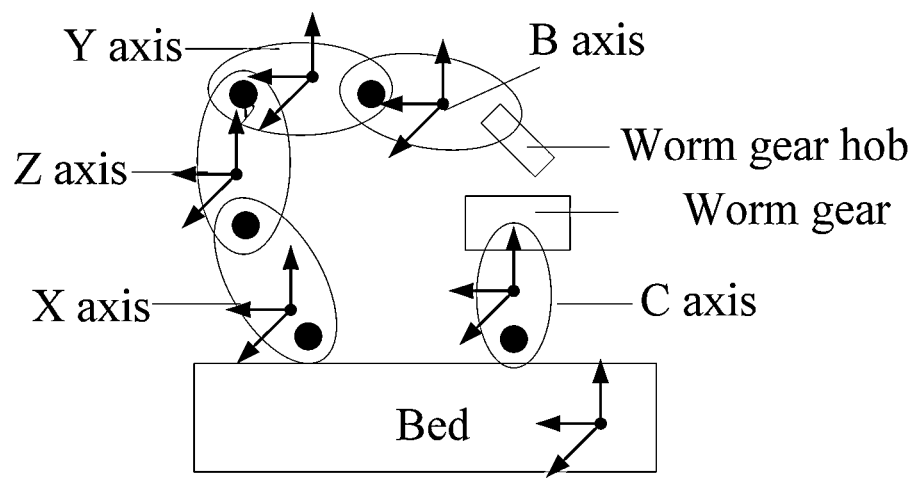
FIG. 1 is a schematic view of a transmission chain of a worm gear machine.

As shown in FIG. 1, the worm gear machine and the topological structure thereof are composed of a workpiece chain and a cutter chain, where the workpiece chain includes a bed, a C-axis and a worm gear, and the cutter chain includes a bed, an X-axis, a Z-axis, a Y-axis, a B-axis and a worm gear hob. The X-axis, Y-axis and Z-axis are linear motion axes, and B-axis and C-axis are rotational motion axes.

The workpiece chain and the cutter chain form a full motion chain of the worm gear machine. On the two motion sub-chains, geometric errors of each component include PIGEs and PDGEs. As the B-axis is a hob axis with a higher level of manufacturing accuracy, its errors are ignored temporarily herein during modeling, and considerations are given to geometric errors of X-, Y-, Z-, and C-motion axes of the worm gear machine.

Each motion axis includes 6 items of PDGEs, respectively including: an x-direction linear error $\delta_x(s)$ of an S-axis in motion, a y-direction linear error $\delta_y(s)$ of the S-axis in motion, a z-direction linear error $\delta_z(s)$ of the S-axis in motion, an x-direction angular error $\varepsilon_x(s)$ of the S-axis in motion, a y-direction angular error $\varepsilon_y(s)$ of the S-axis in motion, and a z-direction angular error $\varepsilon_z(s)$ of the S-axis in motion, where s represents a motion instruction of the motion S-axis, and s=x, y, z, c.

PIGEs are present between the motion axes, respectively including: a perpendicularity error $\varphi_{yz}$ between the X axis and the Z-axis, a perpendicularity error $\varphi_{zy}$ between the Y-axis and the Z-axis, and a perpendicularity error $\varphi_{xy}$ between the Y-axis and the X-axis.

The C-axis has four items of placement errors, respectively including: an x-direction linear error $\delta_{xc}$ of the C-axis in placement, a y-direction linear error $\delta_{yc}$ of the C-axis in placement, an x-direction angular error $\varphi_{xc}$ of the C-axis in placement, and a y-direction angular error $\varphi_{yc}$ of the C-axis in placement.

Specifically, each motion axis of the worm gear machine includes the following geometric error elements:

I. The X-axis has six items of PDGEs, respectively including:
an x-direction linear error $\delta_x(x)$ of the X-axis in motion; a y-direction linear error $\delta_y(x)$ of the X-axis in motion; a z-direction linear error $\delta_z(x)$ of the X-axis in motion; an x-direction angular error $\varepsilon_x(x)$ of the X-axis in motion; a y-direction angular error $\varepsilon_y(x)$ of the X-axis in motion; and a z-direction angular error $\varepsilon_z(x)$ of the X-axis in motion.

II. The Z-axis has six items of PDGEs and one item of PIGE:

The six items of PDGEs are an x-direction linear error $\delta_x(z)$ of the Z-axis in motion; a y-direction linear error $\delta_y(z)$ of the Z-axis in motion; a z-direction linear error $\delta_z(z)$ of the Z-axis in motion; an x-direction angular error $\varepsilon_x(z)$ of the Z-axis in motion; a y-direction angular error $\varepsilon_y(z)$ of the Z-axis in motion; and a z-direction angular error $\varepsilon_z(z)$ of the Z-axis in motion.

One item of PIGE is the perpendicularity error between the Y-axis and the Z-axis.

III. The Y-axis has six items of PDGEs and two items of PIGEs:

The six items of PDGEs are an x-direction linear error $\delta_x(y)$ of the Y-axis in motion; a y-direction linear error $\delta_y(y)$ of the Y-axis in motion; a z-direction linear error $\delta_z(y)$ of the Y-axis in motion; an x-direction angular error $\varepsilon_x(y)$ of the Y-axis in motion; a y-direction angular error $\varepsilon_y(y)$ of the Y-axis in motion; and a z-direction angular error $\varepsilon_z(y)$ of the Y-axis in motion.

The two items of PIGEs are the perpendicularity error $\varphi_{zy}$ between the Y-axis and the X-axis; and the perpendicularity error $\varphi_{xy}$ between the Y-axis and the X-axis.

IV. The C-axis has six items of PDGEs and four items of PIGEs:

The six items of PDGEs are an x-direction linear error $\delta_x(c)$ of the C-axis in motion; a y-direction linear error $\delta_y(c)$ of the C-axis in motion; a z-direction linear error $\delta_z(c)$ of the C-axis in motion; an x-direction angular error $\varepsilon_x(c)$ of the C-axis in motion; a y-direction angular error $\varepsilon_y(c)$ of the C-axis in motion; and a z-direction angular error $\varepsilon_z(c)$ of the C-axis in motion.

The four items of PIGEs are the x-direction linear error $\delta_{xc}$ of the C-axis in placement, the y-direction linear error $\delta_{yc}$ of the C-axis in placement, the x-direction angular error $\varphi_{xc}$ of the C-axis in placement, and the y-direction angular error $\varphi_{yc}$ of the C-axis in placement.

12) Obtain the actual forward kinematic model $T_{27}^a$ and the ideal forward kinematic model $T_{27}^i$ from the coordinate system of the worm gear hob to the coordinate system of the worm gear according to the motion chain of the worm gear machine.

With the worm gear hob as a transfer end point, the worm gear machine has the following motion chain: worm gear→C-axis→bed→X-axis→Z-axis→Y-axis→B-axis-worm gear hob, where the worm gear-C-axis-bed serves as the workpiece chain, and the bed→X-axis→Z-axis→Y-axis→B-axis→worm gear hob serves as the cutter chain.

During consideration of the geometric errors, an actual kinematic model of the tool chain is:

$$T_{02}^a = T_{01}T_{12} = T_{p01}T_{pe01}T_{m01}T_{me01} \times T_{p12}T_{pe12}T_{m12}T_{me12}$$

and an ideal kinematic model of the tool chain is:

$$T_{02}^i = T_{01}^i T_{12}^i = T_{p01}T_{m01} \times T_{p12}T_{m12}$$

where, $T_{02}^a$ and $T_{02}^i$ and represent an actual transformation matrix and an ideal transformation matrix from the worm gear to the bed, respectively; $T_{01}$ and $T_{01}^i$ respectively represent an actual transformation matrix and an ideal transformation matrix from the C-axis to the bed; and $T_{12}$ and $T_{12}^i$ represent an actual transformation matrix and an ideal transformation matrix from the worm gear to the C-axis, respectively;

$T_{p01}$ represents a placement matrix from the C-axis to the bed, and $T_{p01} = I_{4 \times 4}$;

$T_{pe01}$ represents a placement error matrix from the C-axis to the bed, and $$T_{pe01} = \begin{bmatrix} 1 & 0 & \varphi_{yc} & \delta_{xc} \\ 0 & 1 & -\varphi_{xc} & \delta_{yc} \\ -\varphi_{yc} & \varphi_{xc} & 1 & 0 \\ 0 & 0 & 0 & 1 \end{bmatrix};$$

$T_{m01}$ represents a motion matrix from the C-axis to the bed, and $$T_{m01} = \begin{bmatrix} \cos(c) & -\sin(c) & 0 & 0 \\ \sin(c) & \cos(c) & 0 & 0 \\ 0 & 0 & 1 & 0 \\ 0 & 0 & 0 & 1 \end{bmatrix};$$

$T_{me01}$ represents a motion error matrix from the C-axis to the bed, and $$T_{me01} = \begin{bmatrix} 1 & -\varepsilon_z(c) & \varepsilon_y(c) & \delta_x(c) \\ \varepsilon_z(c) & 1 & -\varepsilon_x(c) & \delta_y(c) \\ -\varepsilon_y(c) & \varepsilon_x(c) & 1 & \delta_z(c) \\ 0 & 0 & 0 & 1 \end{bmatrix};$$

$T_{p12}$ represents a placement matrix from the worm gear to the C-axis; $T_{pe12}$ represents a placement error matrix from the worm gear to the C-axis; $T_{m12}$ represents a motion matrix from the worm gear to the C-axis; and $T_{me12}$ represents a motion error matrix from the worm gear to the C-axis;

$$T_{p12} = T_{pe12} = T_{m12} = T_{me12} = I_{4 \times 4}$$

During consideration of the geometric errors, an actual kinematic model of the cutter chain is:

$$T_{07}^a = T_{03}T_{34}T_{45}T_{56}T_{67} = T_{p03}T_{pe03}T_{m03}T_{me03} \times \\ T_{p34}T_{pe34}T_{m34}T_{me34} \times T_{p45}T_{pe45}T_{m45}T_{me45} \times \\ T_{p56}T_{pe56}T_{m56}T_{me56} \times T_{p67}T_{pe67}T_{m67}T_{me67}$$

and an ideal kinematic model of the cutter chain is:

$$T_{07}^i = T_{p03}T_{m03}T_{p34}T_{m34}T_{p45}T_{m45}T_{p56}T_{m56}T_{p67}T_{m67}$$

where, $T_{07}^a$ and $T_{07}^i$ represent an actual transformation matrix and an ideal transformation matrix from the worm gear hob to the bed, respectively; $T_{03}$ represents an actual transformation matrix from the X-axis to the bed; $T_{34}$ represents an actual transformation matrix from the Z-axis to the X-axis; $T_{45}$ represents an actual transformation matrix from the Y-axis to the Z-axis; $T_{56}$ represents an actual transformation matrix from the B-axis to the Y-axis; and $T_{67}$ represents an actual transformation matrix from the worm gear hob to the B-axis;

$T_{p03}$ represents a placement matrix from the X-axis to the bed; $T_{pe03}$ represents a placement error matrix from the X-axis to the bed; and $T_{p03} = T_{pe03} = I_{4 \times 4}$;

$T_{m03}$ represents a motion matrix from the X-axis to the bed, $$T_{m03} = \begin{bmatrix} 1 & 0 & 0 & x \\ 0 & 1 & 0 & 0 \\ 0 & 0 & 1 & 0 \\ 0 & 0 & 0 & 1 \end{bmatrix};$$

$T_{me03}$ represents a motion error matrix from the X-axis to the bed, $$T_{me03} = \begin{bmatrix} 1 & -\varepsilon_z(x) & \varepsilon_y(x) & \delta_x(x) \\ \varepsilon_z(x) & 1 & -\varepsilon_x(x) & \delta_y(x) \\ -\varepsilon_y(x) & \varepsilon_x(x) & 1 & \delta_z(x) \\ 0 & 0 & 0 & 1 \end{bmatrix};$$

$T_{p34}$ represents a placement matrix from the Z-axis to the X-axis, $T_{p34} = I_{4 \times 4}$;

$T_{pe34}$ represents a placement error matrix from the Z-axis to the X-axis, $$T_{pe34} = \begin{bmatrix} 1 & 0 & 0 & 0 \\ 0 & 1 & -\varphi_{yz} & 0 \\ 0 & \varphi_{yz} & 1 & 0 \\ 0 & 0 & 0 & 1 \end{bmatrix};$$

$T_{m34}$ represents a motion matrix from the Z-axis to the X-axis, $$T_{m34} = \begin{bmatrix} 1 & 0 & 0 & 0 \\ 0 & 1 & 0 & 0 \\ 0 & 0 & 1 & z \\ 0 & 0 & 0 & 1 \end{bmatrix};$$

$T_{me34}$ represents a motion error matrix from the Z-axis to the X-axis, $$T_{me34} = \begin{bmatrix} 1 & -\varepsilon_z(z) & \varepsilon_y(z) & \delta_x(z) \\ \varepsilon_z(z) & 1 & -\varepsilon_x(z) & \delta_y(z) \\ -\varepsilon_y(z) & \varepsilon_x(z) & 1 & \delta_z(x) \\ 0 & 0 & 0 & 1 \end{bmatrix};$$

$T_{p45}$ represents a placement matrix from the Y-axis to the Z-axis, $T_{p45} = I_{4 \times 4}$;

$T_{pe45}$ represents a placement error matrix from the Y-axis to the Z-axis, $$T_{pe45} = \begin{bmatrix} 1 & 0 & 0 & 0 \\ 0 & 1 & -\varphi_{yz} & 0 \\ 0 & \varphi_{yz} & 1 & 0 \\ 0 & 0 & 0 & 1 \end{bmatrix};$$

$T_{m45}$ represents a motion matrix from the Y-axis to the Z-axis, $$T_{m45} = \begin{bmatrix} 1 & 0 & 0 & 0 \\ 0 & 1 & 0 & y \\ 0 & 0 & 1 & 0 \\ 0 & 0 & 0 & 1 \end{bmatrix};$$

$T_{me45}$ represents a motion error matrix from the Y-axis to the Z-axis, $$T_{me45} = \begin{bmatrix} 1 & -\varepsilon_z(y) & \varepsilon_y(y) & \delta_x(y) \\ \varepsilon_z(y) & 1 & -\varepsilon_x(y) & \delta_y(y) \\ -\varepsilon_y(y) & \varepsilon_x(y) & 1 & \delta_z(y) \\ 0 & 0 & 0 & 1 \end{bmatrix};$$

and $T_{p56}$ represents a placement matrix from the B-axis to the Y-axis; $T_{pe56}$ represents a placement error matrix from the B-axis to the Y-axis; $T_{m56}$ represents a motion matrix from the B axis to the Y-axis; $T_{me56}$ represents a motion error matrix from the B-axis to the Y-axis; $T_{p67}$ represents a placement matrix from the worm gear hob to the B-axis; $T_{pe67}$ represents a placement error matrix from the worm gear hob to the B-axis; $T_{m67}$ represents a motion matrix from the worm gear hob to the B-axis; $T_{me67}$ represents a motion error matrix from the worm gear hob to the B-axis, and the $T_{p56}$, $T_{pe56}$, $T_{m56}$, $T_{me56}$, $T_{p67}$, $T_{pe67}$, $T_{m67}$ and $T_{me67}$ are all unit matrixes.

Therefore, the actual forward kinematic model of the worm gear machine from the coordinate system of the worm gear hob to the coordinate system of the worm gear is obtained:

$$T_{27}^a = (T_{02}^a)^{-1} T_{07}^a$$

The ideal forward kinematic model of the worm gear machine from the coordinate system of the worm gear hob to the coordinate system of the worm gear is obtained:

$$T_{27}^i = (T_{02}^i)^{-1} T_{07}^i$$

13) Establish the geometric error-pose error model of the worm gear mother from the actual forward kinematic model $T_{27}^a$ and the ideal forward kinematic model $T_{27}^i$.

Assuming that a cutter tip position vector and a cutter axis vector in the coordinate system of the worm gear hob are $P_t$ and $Q_t$, respectively, the actual cutter position data under the influence of the geometric errors is:

$$\begin{bmatrix} Q'_w & P'_w \\ 0 & 1 \end{bmatrix} = T_{27}^a \begin{bmatrix} Q_t & P_t \\ 0 & 1 \end{bmatrix}$$

where, $P'_w = [x', y', z']^T$ and $Q'_w = [i', j', k']^T$ represent an actual cutter tip position vector and an actual cutter axis vector, respectively.

The forward kinematic model of the worm gear machine describes a pose transformation relation between the worm gear hob and the worm gear, and the geometric error-pose error model of the worm gear machine is obtained by performing subtraction on the actual cutter position data and ideal states of the worm gear hob and the worm gear:

$$\begin{bmatrix} \Delta i & \Delta x \\ \Delta j & \Delta y \\ \Delta k & \Delta z \\ 0 & 1 \end{bmatrix} = (T_{27}^a - T_{27}^i) \begin{bmatrix} Q_t & P_t \\ 0 & 1 \end{bmatrix}$$

where, $\Delta i$ represents an x-coordinate error of cutter axis vector data; $\Delta j$ represents a y-coordinate error of the cutter axis vector data; $\Delta k$ represents a z-coordinate error of the cutter axis vector data; $\Delta x$ represents an x-coordinate error of cutter tip position data; $\Delta y$ represents a y-coordinate error of the cutter tip position data; and $\Delta z$ represents a z-coordinate error of the cutter tip position data.

Step b): Regard the geometric error-pose error model of the worm gear machine as an MIMO nonlinear system, and solve, by taking the geometric error of each motion axis of the worm gear machine as an input feature X, and a pose error between the worm gear hob and the worm gear as an output variable Y, then an importance coefficient of each input feature is solved with a random forest algorithm.

Figure 2:
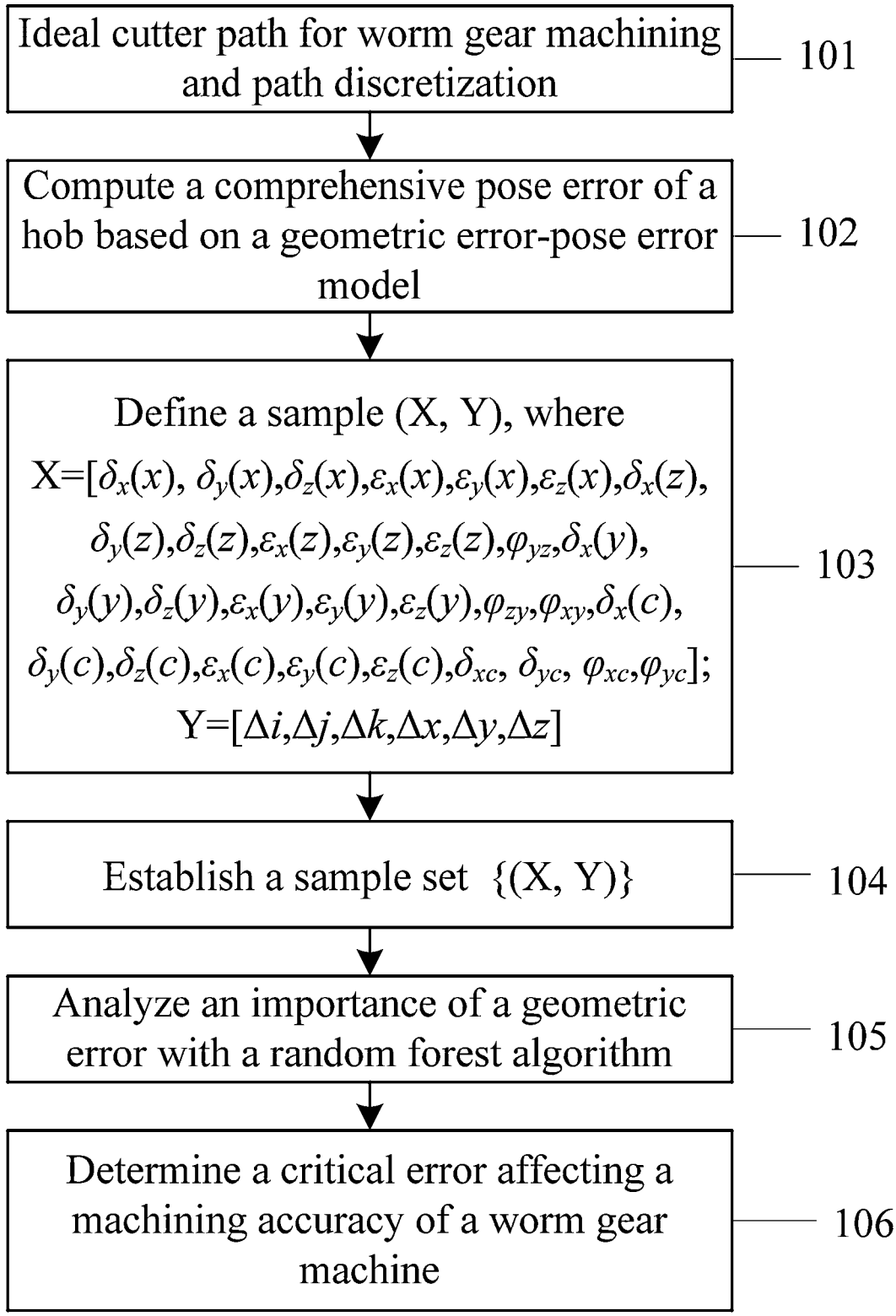
FIG. 2 is a flow chart for identifying a critical error of a worm gear machine with a random forest algorithm.

There are a number of geometric error elements of the worm gear machine. If a critical error item affecting the machining accuracy of the worm gear most can be identified and specific compensation can be performed, both the compensation effect and the compensation efficiency will be greatly improved. The random forest is a machine learning algorithm with a decision tree as a basic learner. All decision trees are established by bootstrap sampling from a total error data set where 75% of data serves as a training set, and 25% of data serves as a validation set. The random forest algorithm not only samples the training sample, but also samples features. With this characteristic, the importance of a feature in a complex nonlinear system may be evaluated with the random forest algorithm. Specifically during critical item identification of the worm gear machine, the core theory is to convert the critical error identification problem into a feature selection problem based on the random forest. During establishment of the random forest, 31 items of geometric errors are used as an input feature X, and 6 items of pose errors between the worm gear hob and the worm gear are used as an output variable Y. The importance coefficient of each input feature (i.e., the geometric error) may be computed according to the following procedures:

Specifically, as shown in FIG. 2, a method for solving the importance coefficient of each input feature with the random forest algorithm is as follows:

Step b1) Establish a decision tree $T_b$ with a bootstrap sampling set, and take a sample not participating in establishment of the decision tree as an out-of-bag (OBB) sample $x_b^{obb}$.

Step b2) Predict the $x_b^{obb}$ with the established decision tree $T_b$, and compute a correctly classified resolution $R_b^{obb}$.

Step b3) for a geometric error element $x_j$ (j=1, ... ,31), a value of the $x_j$ in the $x_j^{obb}$ is changed during initialization, and record the value as $x_{bj}^{obb}$; and then, predict the $x_{bj}^{obb}$ with the decision tree $T_b$, and recording a correctly classified resolution as $R_{bj}^{obb}$.

Step b4) Repeat Step b1) to Step b3), such that an importance coefficient $D_j$ of the geometric error element $x_j$ is:

$$D_j = \frac{1}{n} \sum_{b=1}^{n} \left( R_b^{obb} - R_{bj}^{obb} \right)$$

where, n is the number of repeated times.

Step c): according to the solved importance coefficient of each input feature, determine a critical error affecting a machining accuracy of the worm gear machine.

Ideal cutter path for worm gear machining and path discretization are provided in block 101 in FIG. 2. The method for identifying the critical error of the worm gear machine and method for iteratively compensating the critical error of the worm gear machine provided by the embodiment establishes a pose error relation between a worm gear hob and a worm gear of the worm gear machine under the coupling influence of multiple geometric error elements to quantitatively analyze degrees of influence of the multiple geometric error elements on a machining accuracy of a worm gear, which can be seen in block 102 in FIG. 2; and solve, by taking a geometric error of each motion axis of the worm gear machine as an input feature X and a pose error between the worm gear hob and the worm gear as an output variable Y, which can be seen in blocks 103 and 104 in FIG. 2, and an importance coefficient of each input feature is solved with a random forest algorithm, which can be seen in block 105 in FIG. 2, to identify the critical error element affecting the machining accuracy of the worm gear machine, which can be seen in block 106 in FIG. 2.

Specific implementation of a method for iteratively compensating a critical error of a worm gear machine provided by the embodiment is as follows:

The importance coefficient of the geometric error element that is solved with the random forest is within 0-1, and is an indication of a contribution ratio of the input geometric error element to the output pose error. If comparing the importance coefficient may determine the critical error item affecting each pose error in direction, specific error iterative compensation may be performed.

Figure 3:
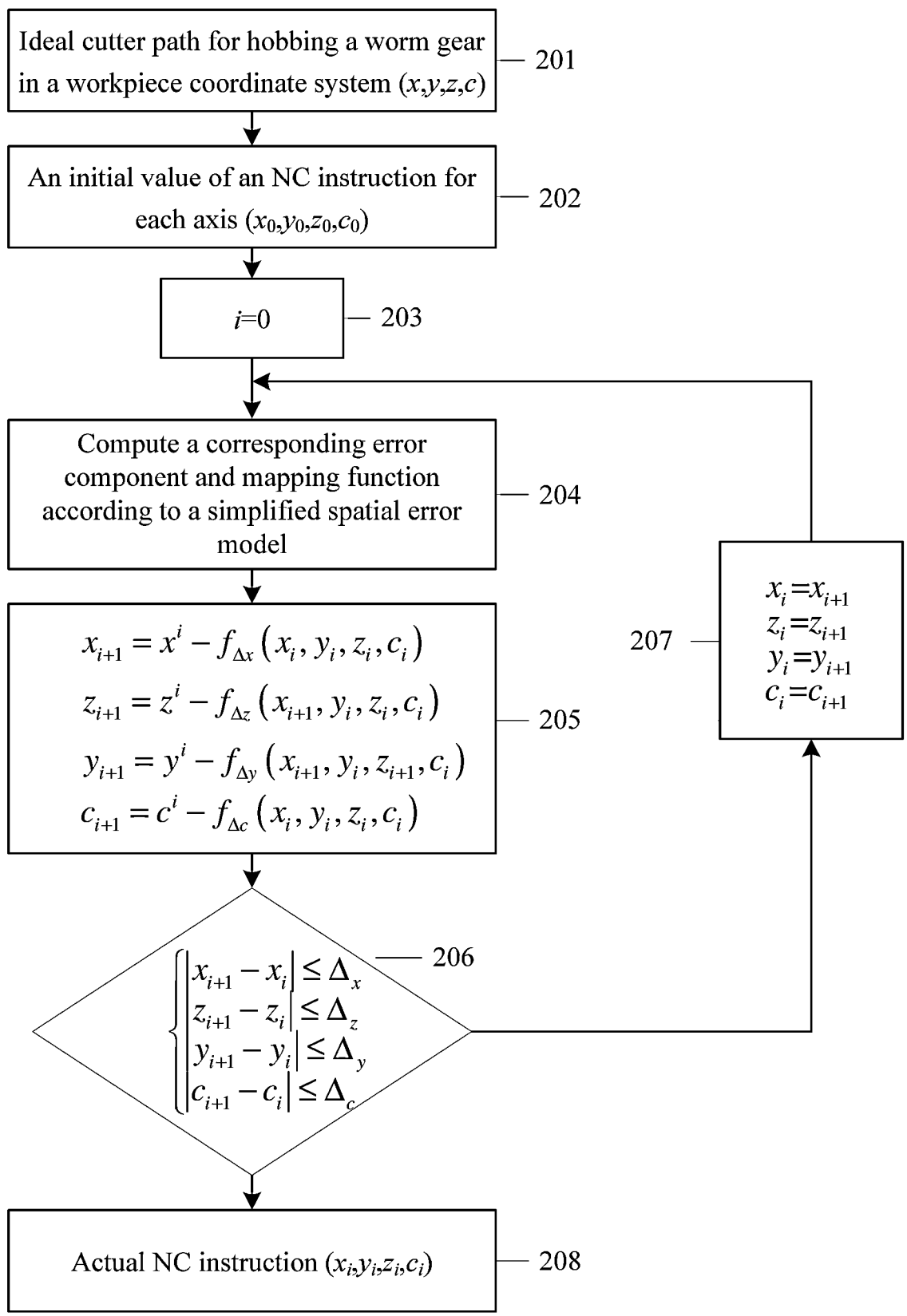
FIG. 3 is a flow chart for iteratively compensating a critical error of a worm gear machine.

As shown in FIG. 3, the method for iteratively compensating a critical error of a worm gear machine in the embodiment includes the following steps:

Step e): by using the above-mentioned method for identifying a critical error of a worm gear machine in the embodiment, determine the critical errors affecting a machining accuracy of a worm gear machine, retain the identified critical error items, and simplify a geometric error-pose error model of the worm gear machine. Ideal cutter path for hobbing a worm gear in a workpiece coordinate system (x,y,z,c) is provided in block 201 in FIG. 3; and an initial value of an NC instruction for each axis $(x_0, y_0, z_0, c_0)$ is provided in block 202 in FIG. 3.

Step f): Obtain, for an x-direction pose error, a mapping relation between the critical error item and the x-direction pose error by using the simplified geometric error-pose error model of the worm gear machine, which can be seen in block 204 in FIG. 3. The following step can refer to block 205 in FIG. 3. If a motion position of the X-axis is controlled by an NC instruction x, an actual x-direction position of a cutter may be set as $x+\Delta x(x,y,z,c)$ according to the simplified error model. The error compensation is intended to drive the X-axis through an NC code x to move to a predetermined position $x^i$. Accordingly, a relation between the ideal cutter position and the NC instruction during compensation may be expressed as $x+\Delta x(x,y,z,c)=x^i$, to obtain the following iteration form of x:

$$x_{i+1}=x^i-f_{\Delta x}(x_i, y_i, z_i, c_i)$$

where, $x_{i+1}$ represents an iterative value of an NC instruction x; $x^i$ represents an instruction when an X-axis reaches a predetermined position; $f_{\Delta x}(\bullet)$ represents a mapping function between the critical error item and an x-direction pose error; and i has an initial value of 0, which can be seen in block 203 in FIG. 3.

Similarly, for a z-direction pose error, a mapping relation between the critical error item and the z-direction pose error may be obtained. The error compensation is intended to drive the Z axis through an NC code z to move to a predetermined position $z^i$. Accordingly, a relation between the ideal cutter position and the NC instruction during compensation may be expressed as $z+\Delta z(x,y,z,c)=z^i$. Meanwhile, as a new iterative value of x also has an impact on $\Delta z$, the iteration form of z is as follows:

$$z_{i+1}=z^i-f_{\Delta z}(x_{i+1}, y_i, z_i, c_i)$$

where, $z_{i+1}$ represents an iterative value of an NC instruction z; $z^i$ represents an instruction when a Z-axis reaches a predetermined position; and $f_{\Delta z}(\bullet)$ represents a mapping function between the critical error item and a z-direction pose error;

By the same seasoning, assuming that an actual y-direction position of the worm gear hob is $y+\Delta y(x,y,z,c)$, the following iteration form of y is obtained:

$$y_{i+1}=y^i-f_{\Delta y}(x_{i+1}, y_i, z_{i+1}, c_i)$$

where, $y_{i+1}$ represents an iterative value of an NC instruction y; $y^i$ represents an instruction when a Y-axis reaches a predetermined position; and $f_{\Delta y}(\bullet)$ represents a mapping function between the critical error item and a y-direction pose error.

In addition, as the C-axis is not located on the same motion sub-chain with three straight axes, it is considered that the axis is not affected by iterative values of the three straight axes. Assuming that an actual c-direction position of the worm gear hob is $c+\Delta c(x,y,z,c)$, the iteration form of the motion instruction c is deduced:

$$c_{i+1}=c^i-f_{\Delta c}(x_i, y_i, z_i, c_i)$$

where, $c_{i+1}$ represents an iterative value of an NC instruction c; $c^i$ represents an instruction when a C-axis reaches a predetermined position; and $f_{\Delta c}(\bullet)$ represents a mapping function between the critical error item and a c-direction pose error;

Step g): Iteratively compensate the critical error, and determine whether a motion accuracy of each of the X-, Z-, Y-, and C-, axes meets a preset threshold requirement; if yes, execute Step d); and if no, let $x_i=x_{i+1}$, $z_i=z_{i+1}$, $y_i=y_{i+1}$, $c_i=c_{i+1}$ and i=i+1 and execute Step f), which can be seen in block 207 in FIG. 3. Specifically, the motion accuracy of each of the X, Z, Y and C axes should meet:

$$\begin{cases} |x_{i+1} - x_i| \le \Delta_x \\ |z_{i+1} - z_i| \le \Delta_z \\ |y_{i+1} - y_i| \le \Delta_y \\ |c_{i+1} - c_i| \le \Delta_c \end{cases}$$

which can be seen in block 206 in FIG. 3, where, $\Delta_x$, $\Delta_z$, $\Delta_y$ and $\Delta_c$ represent a maximum allowable threshold for the motion accuracies of the X-, Z-, Y-, and C axes, respectively.

Step d): Output an actual NC instruction $(x_i, y_i, z_i, c_i)$, which can be seen in block 208 in FIG. 3.

The method for iteratively compensating the critical error of the worm gear machine provided by the embodiment simplifies the geometric error-pose error model of the worm gear machine by using the identified critical errors affecting the machining accuracy of the worm gear machine, and then performs error iterative compensation on NC codes x, z, y and c till a motion accuracy of each of X-, Z-, Y-, and C-axes meets a set threshold requirement, thereby improving the machining accuracy of the worm gear machine.

The above examples are merely preferred embodiments provided to more fully illustrate the present disclosure, and the scope of the present disclosure is not limited thereto. Equivalent substitutions or alternations made by those skilled in the art on the basis of the present disclosure are all within the protection scope of the present disclosure. The protection scope of the present disclosure is subject to the claims.

What is claimed is:

1. A method for identifying a critical error of a worm gear machine, comprising the following steps:
   step a): analyzing a geometric error of each motion axis of the worm gear machine, and obtaining an actual forward kinematic model $T_{27}{}^a$ and an ideal forward kinematic model $T_{27}{}^i$ from a coordinate system of a worm gear hob to a coordinate system of a worm gear based on a motion chain of the worm gear machine, thereby establishing a geometric error-pose error model of the worm gear machine which contains final geometric errors after comparing between the actual forward kinematic model $T_{27}{}^a$ and the ideal forward kinematic model $T_{27}{}^i$;
   step b): having the geometric error-pose error model of the worm gear machine as a multi-input multi-output (MIMO) nonlinear system, and solving, by taking the geometric error of each motion axis of the worm gear machine as an input feature X, and a pose error between the worm gear hob and the worm gear as an output variable Y, a coefficient of each input feature with a random forest algorithm;
   step c): determining, according to the solved coefficient of each input feature, the critical error affecting a machining accuracy of the worm gear machine; and
   step d): outputting numerical control instruction to the worm gear machine to adjust positions of the worm gear hob to correct the critical error affecting the machining accuracy of the worm gear machine;
   wherein in the step a), a method for establishing the geometric error-pose error model of the worm gear machine is as follows:
   step a1) analyzing the geometric error of the worm gear machine;
   step a2) obtaining the actual forward kinematic model $T_{27}{}^a$ and the ideal forward kinematic model $T_{27}{}^i$ from the coordinate system of the worm gear hob to the coordinate system of the worm gear according to the motion chain of the worm gear machine; and
   step a3) establishing the geometric error-pose error model of the worm gear machine from the actual forward kinematic model $T_{27}{}^a$ and the ideal forward kinematic model $T_{27}{}^i$;
   wherein in the step a1), geometric errors of X-, Y-, Z- and C-motion axes of the worm gear machine are considered, wherein
   each motion axis comprises 6 items of position-dependent geometric errors (PDGEs), respectively comprising: an x-direction linear error $\delta_x(s)$ of an S-axis in motion, a y-direction linear error $\delta_y(s)$ of the S-axis in motion, a z-direction linear error $\delta_z(s)$ of the S axis in motion, an x-direction angular error $\varepsilon_x(s)$ of the S-axis in motion, a y-direction angular error $\varepsilon_y(s)$ of the S-axis in motion, and a z-direction angular error $\varepsilon_z(s)$ of the S-axis in motion, wherein s represents a motion instruction of the motion axis S, and s=x, y, z, c;
   position-independent geometric errors (PIGEs) are present between the motion axes, respectively comprising: a perpendicularity error $\varphi_{yz}$ between the X axis and the Z axis, a perpendicularity error $\varphi_{zy}$ between the Y axis and the Z axis, and a perpendicularity error $\varphi_{xy}$ between the Y axis and the X axis; and
   the C axis has four items of placement errors, respectively comprising: an x-direction linear error $\delta_{xc}$ of the C axis in placement, a y-direction linear error $\delta_{yc}$ of the C axis in placement, an x-direction angular error $\varphi_{xc}$ of the C axis in placement, and a y-direction angular error $\varphi_{yc}$ of the C axis in placement.

2. The method for identifying the critical error of the worm gear machine according to claim 1, wherein in the step a2), with the worm gear hob as a transfer end point, the worm gear machine has a following motion chain: worm gear→C-axis→bed→X-axis→Z-axis→Y-axis→B-axis→worm gear hob, wherein the worm gear-C axis-bed serves as a workpiece chain, and the bed→X-axis→Z-axis→Y-axis→B-axis→worm gear hob serves as a cutter chain;
   during consideration of the geometric errors, an actual kinematic model of the tool chain is:

$$T_{02}{}^a = T_{01}T_{12} = T_{p01}T_{pe01}T_{m01}T_{me01} \times T_{p12}T_{pe12}T_{m12}T_{me12};$$

and
an ideal kinematic model of the tool chain is:

$$T_{02}{}^i = T_{01}{}^i T_{12}{}^i = T_{p01}T_{m01} \times T_{p12}T_{m12}$$

wherein, $T_{02}{}^a$ and $T_{02}{}^i$ respectively represent an actual transformation matrix and an ideal transformation matrix from the worm gear to the bed; $T_{01}$ and $T_{01}{}^i$ respectively represent an actual transformation matrix and an ideal transformation matrix from the C axis to the bed; $T_{12}$ and $T_{12}{}^i$ respectively represent an actual transformation matrix and an ideal transformation matrix from the worm gear to the C axis; $T_{p01}$ represents a placement matrix from the C axis to the bed; $T_{pe01}$ represents a placement error matrix from the C axis to the bed; $T_{m01}$ represents a motion matrix from the C axis to the bed; $T_{me01}$ represents a motion error matrix from the C axis to the bed; $T_{p12}$ represents a placement matrix from the worm gear to the C axis; $T_{pe12}$ represents a placement error matrix from the worm gear to the C axis; $T_{m12}$ represents a motion matrix from the worm gear to the C axis; and $T_{me12}$ represents a motion error matrix from the worm gear to the C axis; and
during consideration of the geometric errors, an actual kinematic model of the cutter chain is:

$$T_{07}{}^a = T_{03}T_{34}T_{45}T_{56}T_{67} = T_{p03}T_{pe03}T_{m03}T_{me03} \times T_{p34}T_{pe34}T_{m34}T_{me34} \times T_{p45}T_{pe45}T_{m45}T_{me45} \times T_{p56}T_{pe56}T_{m56}T_{me56} \times T_{p67}T_{pe67}T_{m67}T_{me67};$$

and
an ideal kinematic model of the cutter chain is:

$$T_{07}{}^i = T_{p03}T_{m03}T_{p34}T_{m34}T_{p45}T_{m45}T_{p56}T_{m56}T_{p67}T_{m67}$$

wherein, $T_{07}{}^a$ and $T_{07}{}^i$ respectively represent an actual transformation matrix and an ideal transformation matrix from the worm gear hob to the bed; $T_{03}$ represents an actual transformation matrix from the X axis to the bed; $T_{34}$ represents an actual transformation matrix from the Z axis to the X axis; $T_{45}$ represents an actual transformation matrix from the Y axis to the Z axis; $T_{56}$ represents an actual transformation matrix from the B axis to the Y axis; represents an actual transformation matrix from the worm gear hob to the B axis; $T_{p03}$ represents a placement matrix from the X axis to the bed; $T_{pe03}$ represents a placement error matrix from the X axis to the bed; $T_{m03}$ represents a motion matrix from the X axis to the bed; $T_{me03}$ represents a motion error matrix from the X axis to the bed; $T_{p34}$ represents a placement matrix from the Z axis to the X axis; $T_{pe34}$ represents a placement error matrix from the Z axis to the X axis; $T_{m34}$ represents a motion matrix from the Z axis to the X axis; $T_{me34}$ represents a motion error matrix from the Z axis to the X axis; $T_{p45}$ represents a placement matrix from the Y axis to the Z axis; $T_{pe45}$ represents a placement error matrix from the Y axis to the Z axis; $T_{m45}$ represents a motion matrix from the Y axis to the Z axis; $T_{me45}$ represents a motion error matrix from the Y axis to the Z axis; $T_{p56}$ represents a placement matrix from the B axis to the Y axis; $T_{pe56}$ represents a placement error matrix from the B axis to the Y axis; $T_{m56}$ represents a motion matrix from the B axis to the Y axis; $T_{me56}$ represents a motion error matrix from the B axis to the Y axis; $T_{p67}$ represents a placement matrix from the worm gear hob to the B axis; $T_{pe67}$ represents a placement error matrix from the worm gear hob to the B axis; $T_{m67}$ represents a motion matrix from the worm gear hob to the B axis; and $T_{me67}$ represents a motion error matrix from the worm gear hob to the B axis, thereby obtaining the actual forward kinematic model of the worm gear machine from the coordinate system of the worm gear hob to the coordinate system of the worm gear:

$$T_{27}{}^a = (T_{02}{}^a)^{-1} T_{07}{}^a;$$

and
obtaining the ideal forward kinematic model of the worm gear machine from the coordinate system of the worm gear hob to the coordinate system of the worm gear:

$$T_{27}{}^i = (T_{02}{}^i)^{-1} T_{07}{}^i.$$

3. The method for identifying the critical error of the worm gear machine according to claim 2, wherein in the step a3), assuming that a cutter tip position vector and a cutter axis vector in the coordinate system of the worm gear hob are respectively $P_t$ and $Q_t$, actual cutter position data under the influence of the geometric errors is:

$$\begin{bmatrix} Q'_w & P'_w \\ 0 & 1 \end{bmatrix} = T_{27}^a \begin{bmatrix} Q_t & P_t \\ 0 & 1 \end{bmatrix}$$

wherein, $P'_w = [x', y', z']^T$ and $Q'_w = [i', j', k']^T$ respectively represent an actual cutter tip position vector and an actual cutter axis vector;

the geometric error-pose error model of the worm gear machine is obtained by performing subtraction on the actual cutter position data and ideal states of the worm gear hob and the worm gear:

$$\begin{bmatrix} \Delta i & \Delta x \\ \Delta j & \Delta y \\ \Delta k & \Delta z \\ 0 & 1 \end{bmatrix} = (T_{27}^a - T_{27}^i) \begin{bmatrix} Q_t & P_t \\ 0 & 1 \end{bmatrix}$$

wherein, $\Delta i$ represents an x-coordinate error of cutter axis vector data; $\Delta j$ represents a y-coordinate error of the cutter axis vector data; $\Delta k$ represents a z-coordinate error of the cutter axis vector data; $\Delta x$ represents an x-coordinate error of cutter tip position data; $\Delta y$ represents a y-coordinate error of the cutter tip position data; and $\Delta z$ represents a z-coordinate error of the cutter tip position data.

4. The method for identifying the critical error of the worm gear machine according to claim 3, wherein in the step b), a method for solving the coefficient of each input feature with the random forest algorithm is as follows:

step b1) establishing a decision tree $T_b$ with a bootstrap sampling set, and taking a sample not participating in establishment of the decision tree as an out-of-bag (OBB) sample $x_b^{obb}$;

step b2) predicting the $x_b^{obb}$ with the established decision tree $T_b$, and computing a correctly classified resolution $R_b^{obb}$;

step b3) changing, for a geometric error element $x_j$ (j=1, ..., 31), a value of the $x_j$ in the $x_b^{obb}$ during initialization, and recording the value as $x_{bj}^{obb}$; and then, predicting the $x_{bj}^{obb}$ with the decision tree $T_b$, and recording a correctly classified resolution as $R_{bj}^{obb}$; and step b4) repeating the step b1) to the step b3), such that a coefficient $D_j$ of the geometric error element xj is:

$$D_j = \frac{1}{n} \sum_{b=1}^{n} (R_b^{obb} - R_{bj}^{obb})$$

wherein, n is the number of repeated times.

5. A method for iteratively compensating a critical error of a worm gear machine, comprising the following steps:

step e): determining, by using the method for identifying the critical error of the worm gear machine according to claim 1, the critical error affecting the machining accuracy of the worm gear machine, retaining the identified critical error item, and simplifying the geometric error-pose error model of the worm gear machine;

step f): assuming that an actual x-direction position of the worm gear hob is $x+\Delta x(x,y,z,c)$, obtaining a following iteration form of x:

$$x_{i+1} = x^i - f_{\Delta x}(x_i, y_i, z_i, c_i)$$

wherein, $x_{i+1}$ represents an iterative value of a numerical control instruction x; $x^i$ represents an instruction when an X axis reaches a predetermined position; $f_{\Delta x}(\bullet)$ represents a mapping function between the critical error item and an x-direction pose error; and a subscript i represents the number of iterative times;

assuming that an actual x-direction position of the worm gear hob is $z+\Delta z(x,y,z,c)$, obtaining a following iteration form of z:

$$z_{i+1} = z^i - f_{\Delta z}(x_{i+1}, y_i, z_i, c_i)$$

wherein, $z_{i+1}$ represents an iterative value of a numerical control instruction z; $z^i$ represents an instruction when a Z axis reaches a predetermined position; and $f_{\Delta z}(\bullet)$ represents a mapping function between the critical error item and a z-direction pose error;

assuming that an actual y-direction position of the worm gear hob is $y+\Delta y(x,y,z,c)$, obtaining a following iteration form of y:

$$y_{i+1} = y^i - f_{\Delta y}(x_{i+1}, y_i, z_{i+1}, c_i)$$

wherein, $y_{i+1}$ represents an iterative value of a numerical control instruction y; $y^i$ represents an instruction when a Y axis reaches a predetermined position; and $f_{\Delta y}(\bullet)$ represents a mapping function between the critical error item and a y-direction pose error; and assuming that an actual c-direction position of the worm gear hob is $c+\Delta c(x,y,z,c)$, obtaining a following iteration form of c:

$$c_{i+1} = c^i - f_{\Delta c}(x_i, y_i, z_i, c_i)$$

wherein, $c_{i+1}$ represents an iterative value of a numerical control instruction c; $c^i$ represents an instruction when a C axis reaches a predetermined position; and $f_\Delta(\bullet)$ represents a mapping function between the critical error item and a c-direction pose error;

step g): iteratively compensating the critical error, and determining whether a motion accuracy of each of the X, Z, Y and C axes meets a preset threshold requirement; if yes, executing the step d); and if no, letting $x_i=x_{i+1}$, $z_i=z_{i+1}$, $y_i=y_{i+1}$, $c_i=c_{i+1}$ and i=i+1 and executing the step f); and wherein the step of outputting the numerical control instruction comprises outputting the numerical control instruction ($x_i$, $y_i$, $z_i$, $c_i$) to the worm gear machine to adjust the x-direction, y-direction, z-direction and c-direction positions of the worm gear hob to $x_i$, $y_i$, $z_i$, and $c_i$, respectively.

6. The method for identifying the critical error of the worm gear machine according to claim 5, wherein in the step a2), with the worm gear hob as a transfer end point, the worm gear machine has a following motion chain: worm gear→C-axis→bed→X-axis→Z-axis→Y-axis→B-axis-→worm gear hob, wherein the worm gear-C axis-bed serves as a workpiece chain, and the bed→X-axis→Z-axis→Y-axis→B-axis→worm gear hob serves as a cutter chain;

during consideration of the geometric errors, an actual kinematic model of the tool chain is:

$$T_{02}^a = T_{01}T_{12} = T_{p01}T_{pe01}T_{m01}T_{me01} \times T_{p12}T_{pe12}T_{m12}T_{me12};$$

and an ideal kinematic model of the tool chain is:

$$T_{02}^i = T_{01}^i T_{12}^i = T_{p01}T_{m01} \times T_{p12}T_{m12}$$

wherein, $T_{02}^a$ and $T_{02}^i$ respectively represent an actual transformation matrix and an ideal transformation matrix from the worm gear to the bed; $T_{01}$ and $T_{01}^i$ respectively represent an actual transformation matrix and an ideal transformation matrix from the C axis to the bed; $T_{12}$ and $T_{12}^i$ respectively represent an actual transformation matrix and an ideal transformation matrix from the worm gear to the C axis; $T_{p01}$ represents a placement matrix from the C axis to the bed; $T_{pe01}$ represents a placement error matrix from the C axis to the bed; $T_{m01}$ represents a motion matrix from the C axis to the bed; $T_{me01}$ represents a motion error matrix from the C axis to the bed; $T_{p12}$ represents a placement matrix from the worm gear to the C axis; $T_{pe12}$ represents a placement error matrix from the worm gear to the C axis; $T_{m12}$ represents a motion matrix from the worm gear to the C axis; and $T_{me12}$ represents a motion error matrix from the worm gear to the C axis; and during consideration of the geometric errors, an actual kinematic model of the cutter chain is:

$$T_{07}^a = T_{03}T_{34}T_{45}T_{56}T_{67} = T_{p03}T_{pe03}T_{m03}T_{me03} \times T_{p34}T_{pe34}T_{m34}T_{me34} \times T_{p45}T_{pe45}T_{m45}T_{me45} \times T_{p56}T_{pe56}T_{m56}T_{me56} \times T_{p67}T_{pe67}T_{m67}T_{me67};$$

and an ideal kinematic model of the cutter chain is:

$$T_{07}^i = T_{p03}T_{m03}T_{p34}T_{m34}T_{p45}T_{m45}T_{p56}T_{m56}T_{p67}T_{m67}$$

wherein, $T_{07}^a$ and $T_{07}^i$ respectively represent an actual transformation matrix and an ideal transformation matrix from the worm gear hob to the bed; $T_{03}$ represents an actual transformation matrix from the X axis to the bed; $T_{34}$ represents an actual transformation matrix from the Z axis to the X axis; $T_{45}$ represents an actual transformation matrix from the Y axis to the Z axis; $T_{56}$ represents an actual transformation matrix from the B axis to the Y axis; $T_{67}$ represents an actual transformation matrix from the worm gear hob to the B axis; $T_{p03}$ represents a placement matrix from the X axis to the bed; $T_{pe03}$ represents a placement error matrix from the X axis to the bed; $T_{m03}$ represents a motion matrix from the X axis to the bed; $T_{me03}$ represents a motion error matrix from the X axis to the bed; $T_{p34}$ represents a placement matrix from the Z axis to the X axis; $T_{pe34}$ represents a placement error matrix from the Z axis to the X axis; $T_{m34}$ represents a motion matrix from the Z axis to the X axis; $T_{me34}$ represents a motion error matrix from the Z axis to the X axis; $T_{p45}$ represents a placement matrix from the Y axis to the Z axis; $T_{pe45}$ represents a placement error matrix from the Y axis to the Z axis; $T_{m45}$ represents a motion matrix from the Y axis to the Z axis; $T_{me45}$ represents a motion error matrix from the Y axis to placement error matrix from the B axis to the Y axis; $T_{m56}$ represents a motion matrix from the B axis to the Y axis; $T_{me56}$ represents a motion error matrix from the B axis to the Y axis; $T_{p67}$ represents a placement matrix from the worm gear hob to the B axis; $T_{pe67}$ represents a placement error matrix from the worm gear hob to the B axis; $T_{m67}$ represents a motion matrix from the worm gear hob to the B axis; and $T_{me67}$ represents a motion error matrix from the worm gear hob to the B axis, thereby obtaining the actual forward kinematic model of the worm gear machine from the coordinate system of the worm gear hob to the coordinate system of the worm gear:

$$T_{27}^a = (T_{02}^a)^{-1} T_{07}^a;$$

and obtaining the ideal forward kinematic model of the worm gear machine from the coordinate system of the worm gear hob to the coordinate system of the worm gear:

$$T_{27}^a = (T_{02}^a)^{-1} T_{07}^a.$$

7. The method for identifying the critical error of the worm gear machine according to claim 6, wherein in the step a3), assuming that a cutter tip position vector and a cutter axis vector in the coordinate system of the worm gear hob are respectively $P_t$ and $Q_t$, actual cutter position data under the influence of the geometric errors is:

$$\begin{bmatrix} Q'_w & P'_w \\ 0 & 1 \end{bmatrix} = T_{27}^a \begin{bmatrix} Q_t & P_t \\ 0 & 1 \end{bmatrix}$$

wherein, $P'_w = [x', y', z']^T$ and $Q'_w = [i', j', k']^T$ respectively represent an actual cutter tip position vector and an actual cutter axis vector;

the geometric error-pose error model of the worm gear machine is obtained by performing subtraction on the actual cutter position data and ideal states of the worm gear hob and the worm gear:

$$\begin{bmatrix} \Delta i & \Delta x \\ \Delta j & \Delta y \\ \Delta k & \Delta z \\ 0 & 1 \end{bmatrix} = (T_{27}^a - T_{27}^i) \begin{bmatrix} Q_t & P_t \\ 0 & 1 \end{bmatrix}$$

wherein, Δi represents an x-coordinate error of cutter axis vector data; Δj represents a y-coordinate error of the cutter axis vector data; Δk represents a z-coordinate error of the cutter axis vector data; Δx represents an x-coordinate error of cutter tip position data; Δy represents a y-coordinate error of the cutter tip position data; and Δz represents a z-coordinate error of the cutter tip position data.

8. The method for iteratively compensating the critical error of the worm gear machine according to claim 6, wherein in the step g), the motion accuracies of each of the X, Z, Y and C axes meets:

$$\begin{cases} |x_{i+1} - x_i| \le \Delta_x \\ |z_{i+1} - z_i| \le \Delta_z \\ |y_{i+1} - y_i| \le \Delta_y \\ |c_{i+1} - c_i| \le \Delta_c \end{cases}$$

wherein, $\Delta_x$, $\Delta_z$, $\Delta_y$ and $\Delta_c$ respectively represent a maximum allowable threshold for the motion accuracies of the X, Z, Y and C axes.

9. The method for identifying the critical error of the worm gear machine according to claim 7, wherein in the step b), a method for solving the coefficient of each input feature with the random forest algorithm is as follows:

step b1) establishing a decision tree $T_b$ with a bootstrap sampling set, and taking a sample not participating in establishment of the decision tree as an out-of-bag (OBB) sample $x_b^{obb}$;

step b2) predicting the $x_b^{obb}$ with the established decision tree $T_b$, and computing a correctly classified resolution $R_b^{obb}$;

step b3) changing, for a geometric error element $x_j$ (j=1, . . . , 31), a value of the $x_j$ in the $x_b^{obb}$ during initialization, and recording the value as $x_{bj}^{obb}$; and then, predicting the $x_{bj}^{obb}$ with the decision tree $T_b$, and recording a correctly classified resolution as $R_{bj}^{obb}$; and step b4) repeating the step b1) to the step b3), such that a coefficient $D_j$ of the geometric error element xj is:

$$D_j = \frac{1}{n}\sum_{b=1}^{n}\left(R_b^{obb} - R_{bj}^{obb}\right)$$

wherein, n is the number of repeated times.

10. The method for iteratively compensating the critical error of the worm gear machine according to claim 7, wherein in the step g), the motion accuracies of each of the X, Z, Y and C axes meets:

$$\begin{cases} |x_{i+1} - x_i| \le \Delta_x \\ |z_{i+1} - z_i| \le \Delta_z \\ |y_{i+1} - y_i| \le \Delta_y \\ |c_{i+1} - c_i| \le \Delta_c \end{cases}$$

wherein, $\Delta_x$, $\Delta_z$, $\Delta_y$ and $\Delta_c$ respectively represent a maximum allowable threshold for the motion accuracies of the X, Z, Y and C axes.

11. The method for iteratively compensating the critical error of the worm gear machine according to claim 9, wherein in the step g), the motion accuracies of each of the X, Z, Y and C axes meets:

$$\begin{cases} |x_{i+1} - x_i| \le \Delta_x \\ |z_{i+1} - z_i| \le \Delta_z \\ |y_{i+1} - y_i| \le \Delta_y \\ |c_{i+1} - c_i| \le \Delta_c \end{cases}$$

wherein, $\Delta_x$, $\Delta_z$, $\Delta_y$ and $\Delta_c$ respectively represent a maximum allowable threshold for the motion accuracies of the X, Z, Y and C axes.

12. The method for iteratively compensating the critical error of the worm gear machine according to claim 5, wherein in the step g), the motion accuracy of each of the X, Z, Y and C axes meets:

$$\begin{cases} |x_{i+1} - x_i| \le \Delta_x \\ |z_{i+1} - z_i| \le \Delta_z \\ |y_{i+1} - y_i| \le \Delta_y \\ |c_{i+1} - c_i| \le \Delta_c \end{cases}$$

wherein, $\Delta_x$, $\Delta_z$, $\Delta_y$ and $\Delta_c$ respectively represent a maximum allowable threshold for the motion accuracies of the X, Z, Y and C axes.

* * * * *

UNITED STATES PATENT AND TRADEMARK OFFICE
CERTIFICATE OF CORRECTION

| | | |
|---|---|---|
| PATENT NO. | : 12,066,809 B2 | Page 1 of 1 |
| APPLICATION NO. | : 17/470015 | |
| DATED | : August 20, 2024 | |
| INVENTOR(S) | : Shilong Wang et al. | |

It is certified that error appears in the above-identified patent and that said Letters Patent is hereby corrected as shown below:

In the Claims

Claim 2, Column 16, Line 62, please delete the phrase "the Y axis; represents an actual" and replace with "the Y axis; $T_{67}$ represents an actual"

Signed and Sealed this
First Day of October, 2024

Katherine Kelly Vidal
*Director of the United States Patent and Trademark Office*